United States Patent [19]

Davis, Jr.

[11] 4,236,699

[45] Dec. 2, 1980

[54] APPARATUS FOR WET-POST TREATMENT OF METALLIZED IRON ORE

[75] Inventor: William L. Davis, Jr., Bakersfield, Calif.

[73] Assignee: Hicap Engineering & Development Corporation, Salt Lake City, Utah

[21] Appl. No.: 923,166

[22] Filed: Jul. 10, 1978

[51] Int. Cl.$^3$ ............................................. C21D 9/00
[52] U.S. Cl. ...................................... 266/114; 75/33; 75/44 R; 148/6.35; 266/115; 432/85
[58] Field of Search ............... 266/114, 115, 116, 146, 266/147; 75/44 R, 44 S, 33–37; 210/195 R–197, 173, 296, 195.1–195.4; 264/111; 432/77, 85; 422/213; 148/6.35

[56] References Cited

U.S. PATENT DOCUMENTS

| | | | |
|---|---|---|---|
| 3,140,169 | 7/1964 | Smith et al. | 75/35 |
| 3,160,498 | 12/1964 | Olt et al. | 75/35 |
| 3,497,190 | 2/1970 | Moore | 75/44 R |
| 3,615,340 | 10/1971 | Fuqua | 75/0.5 BA |
| 3,617,394 | 11/1971 | Moyer | 148/6.35 |
| 3,687,717 | 8/1972 | Philip | 427/213 |
| 4,057,978 | 11/1977 | Sato et al. | 75/5 |
| 4,076,520 | 2/1978 | Pietsch | 75/5 |

Primary Examiner—L. Dewayne Rutledge
Assistant Examiner—Michael L. Lewis
Attorney, Agent, or Firm—M Reid Russell

[57] ABSTRACT

An apparatus and process for treatment of metallized iron ore produced by direct reduction techniques principally for use in various iron and steelmaking furnaces. The apparatus and process receives the product from a direct reduction facility consisting of hot metallized fine sizes of reduced iron ore such as from a fluidized bed reactor system that can be combined with metallized iron ore pellets or like agglomerates from other types of direct reduction reactors. The present invention involves dry and wet treatment and handling apparatus and procedures wherewith the hot metallized fine sizes, optionally including metallized pellets or agglomerates, are rendered immune from reoxidation and degradation for unlimited periods of time whether in open storage or during transport, whereafter the stabilized product can be readily used in various types of iron and steelmaking furnaces.

3 Claims, 14 Drawing Figures

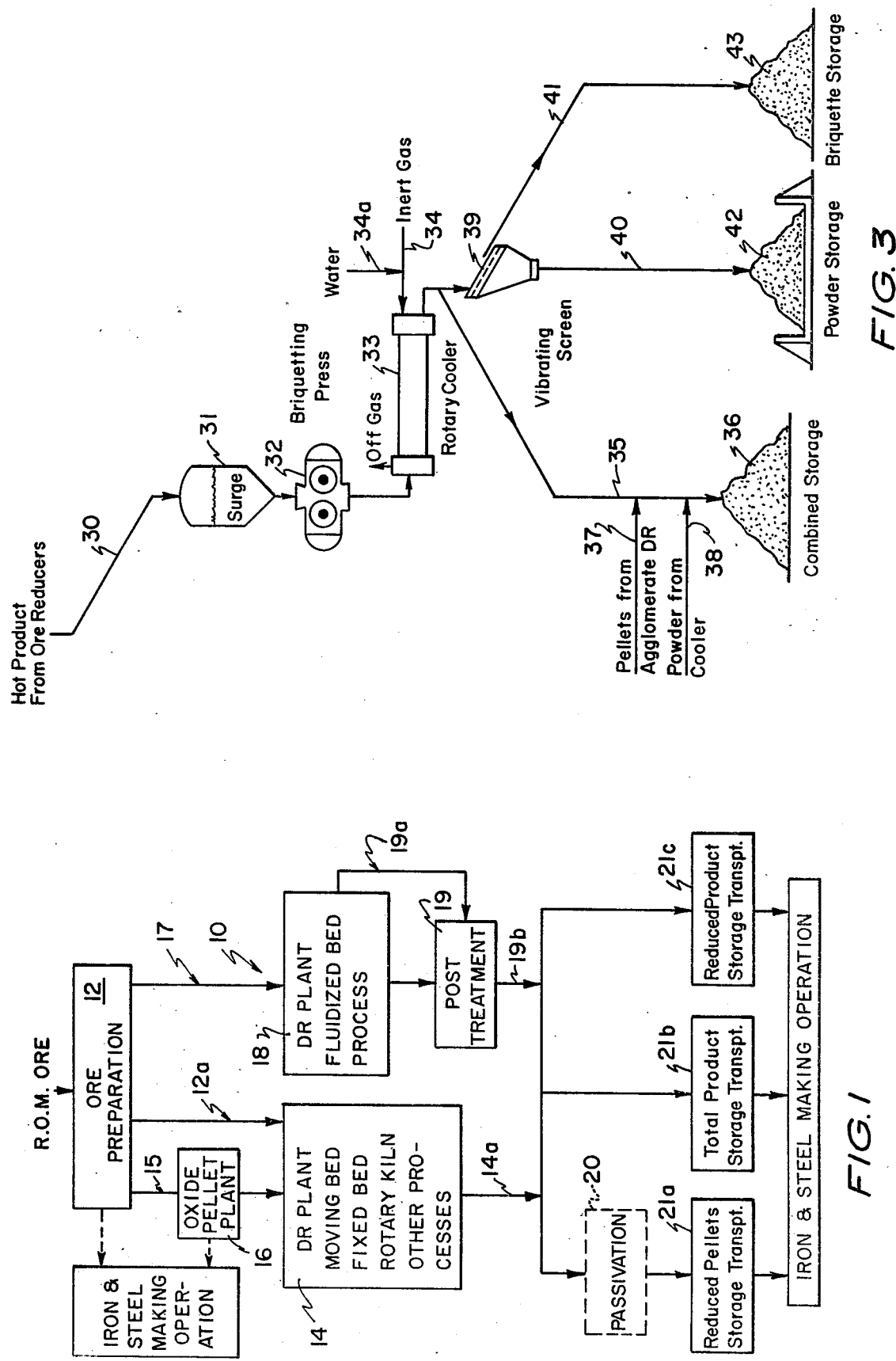

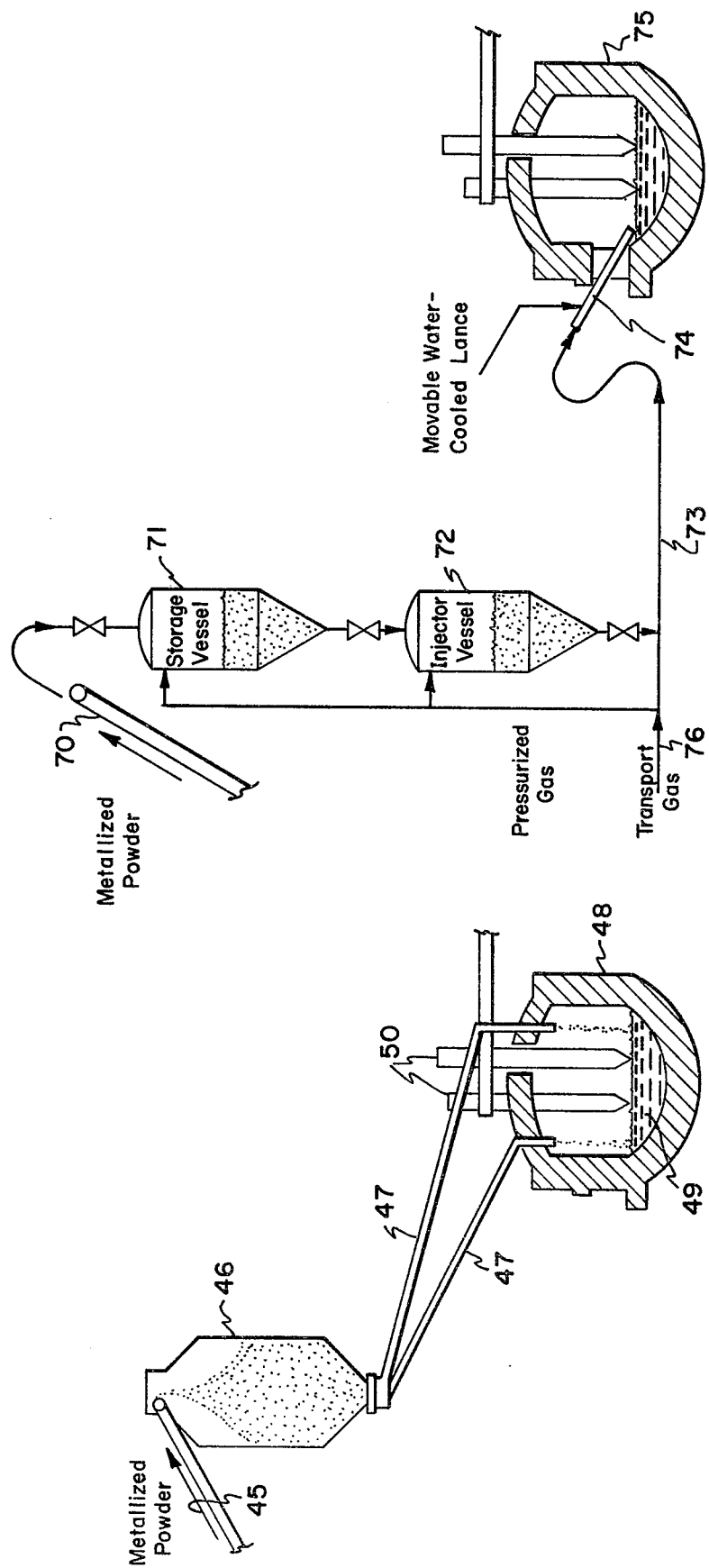

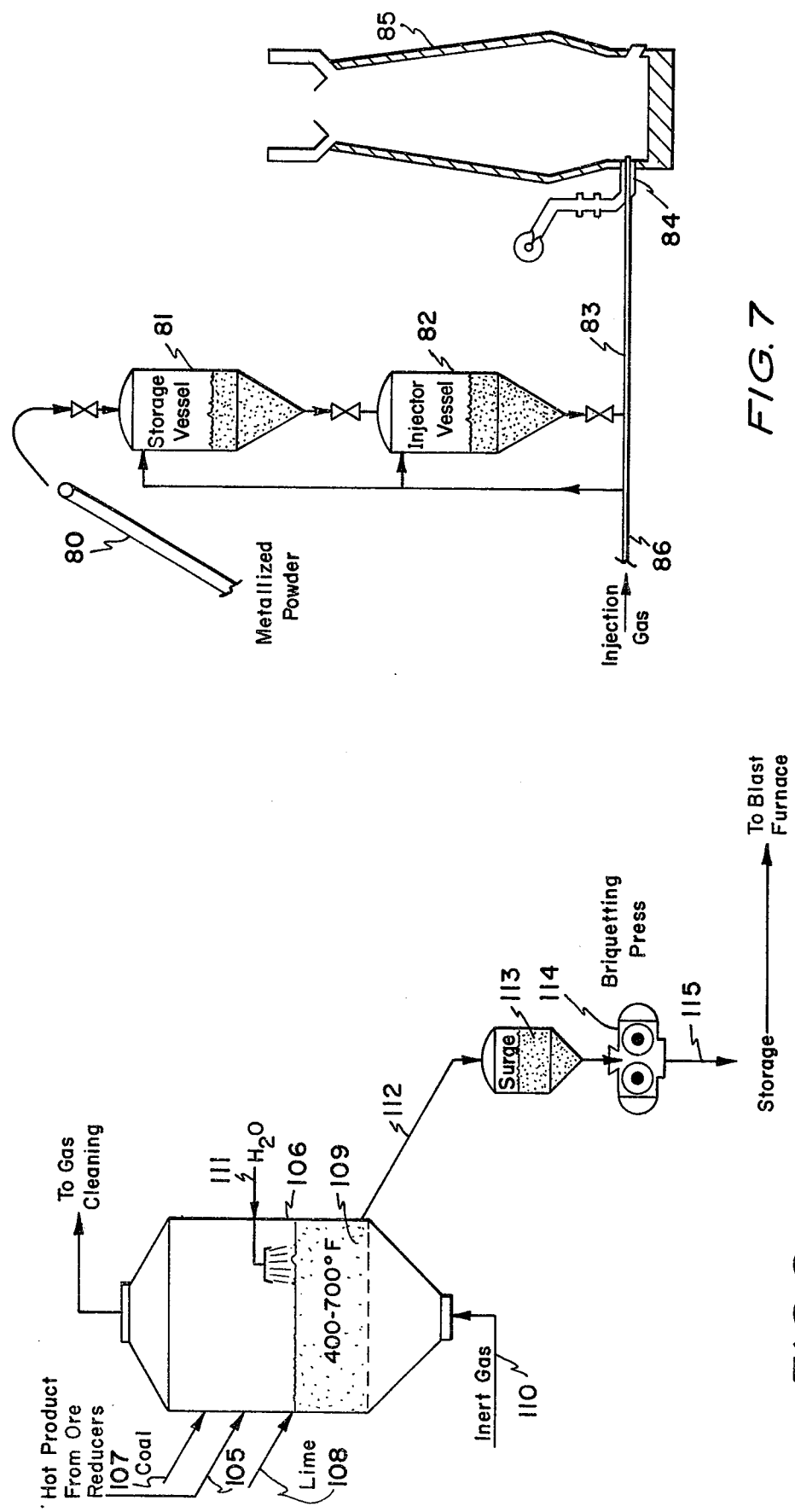

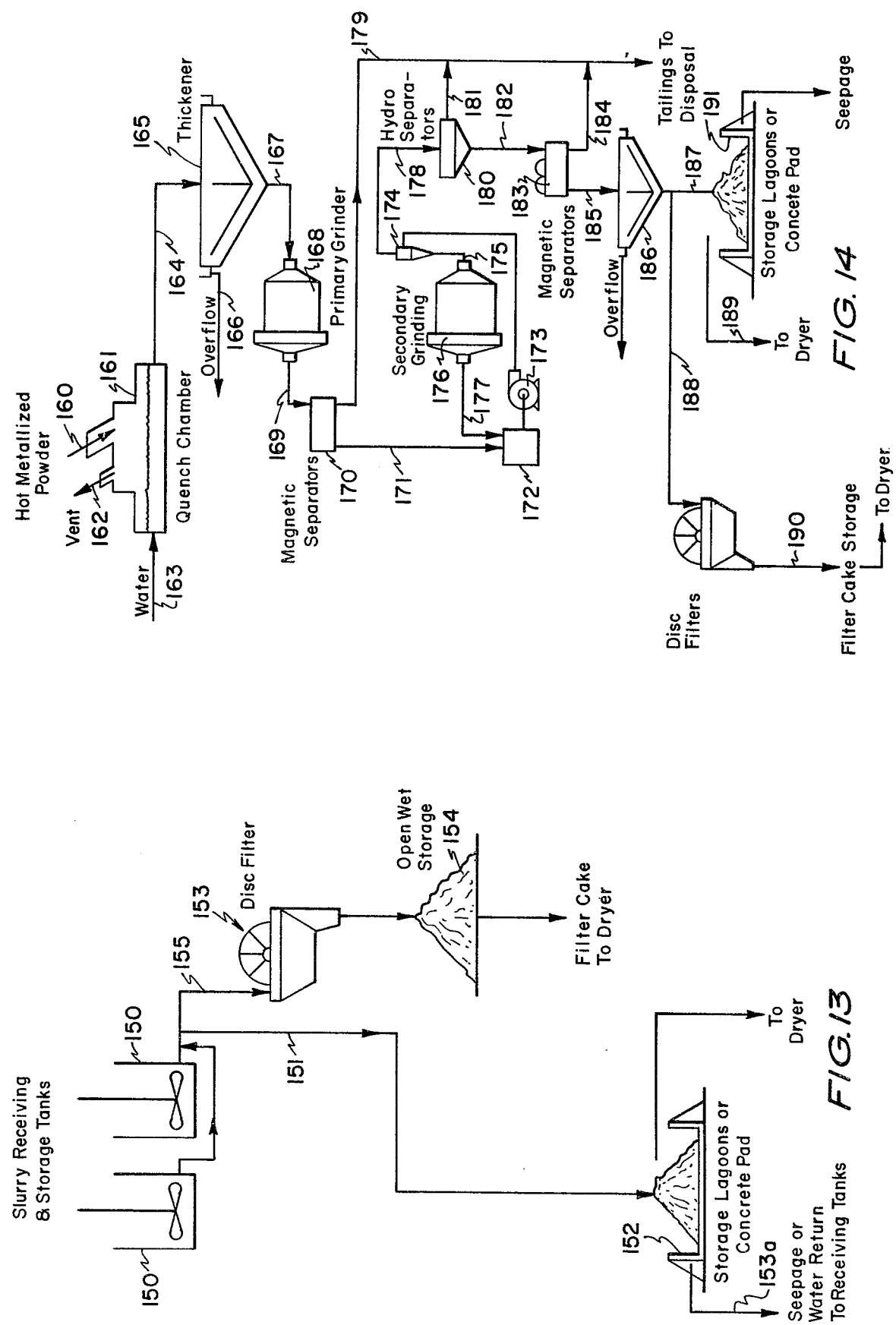

APPARATUS FOR WET-POST TREATMENT OF METALLIZED IRON ORE

BACKGROUND OF THE INVENTION

1. Field of the Invention

The present invention relates to methods and apparatus for treatment, handling, transport & storage of metallized iron ore produced by direct reduction techniques, and that products use in various types of iron and steelmaking furnaces.

2. History of the Invention

The annual world's direct reduction capacity by all processes in 1970 was less than three million tonnes, but in 1977 it had risen to 15 million tonnes. Over 30 million tonnes are indicated in 1980, and, by the end of the century with the world's steel capacity projected to be one billion tonnes, direct reduction will account for some 100 million tonnes. A current update with projections is presented by Miller, J. R., "Global Status of Direct Reduction—1977," Iron and Steel Engineer, September 1977.

Many reasons, both technical and economic, exist for this impressive growth, which largely is occurring in developing nations rather than in those already industrialized. The three most significant reasons for this growth are: (1) that direct reduction lends itself to limited production of metallized iron ore at moderate investments, in contrast to the massive capital outlays required for construction and operation of a modern blast furnace plant and related facilities such as those employed for coke production; (2) direct reduction can employ energy and fuels for ore reduction, such as natural gas, oil, and non-coking coals, but can be used, if at all, only in very limited quantities in the iron blast furnace process; and (3) melting and refining to steel or metallized iron ore produced by direct reduction techniques is readily accomplished in electric furnaces at moderate costs, in contrast to massive open-hearth or basic-oxygen steelmaking shops required for refining blast furnace molten pig iron or hot metal. Therefore, for a country having either or both iron ores and suitable fuel and energy supplies, direct reduction plants are ideal for providing that country with the basis for an iron and steel industry at minimal costs. In industrialized countries, while direct reduction plants have been constructed and are in operation, their growth has been hampered by fuel and energy shortages, particularly natural gas, from which reducing gases can be produced. However, as reserves of coal suitable for coke manufacturing for use in blast furnaces diminish, the development of coal gasification processes that utilize non-coking coals for producing reducing gases will provide incentives for further applications of direct reduction technology. Oil and natural gas rich nations that are deficient in iron ore are now construction direct reduction plants to metallize imported iron ore for domestic use and for export to world markets.

Whether for local use or export, a significant limitation on growth of direct reduction facilities results from the tendencies of metallized iron ore to reoxidize during short and long-term storage, transport, exposure to atmospheric oxygen, and weathering effects. Iron ore that reoxidizes, of course, loses its hard won degrees of metallization, and may spontaneously ignite and burn. Also, such metallized iron ore in storage in confined areas where it comes in contact with moisture can generate hydrogen. Thus, such decomposition of the metallized iron ore, in addition to losing the economic value thereof, can create serious hazards to personnel and equipent. The solution of such serious problems and hazards therefore would be a significant improvement in direct reduction technology and serve to promote additional applications and growth.

The products from the various direct reduction processes would also greatly add to the versatility of direct reduction and promote growth and so are also the subject of the present invention.

3. Prior Art

The accepted definition of direct reduction applies to processes in which reduction and resulting metallization of iron oxide ores occurs below the melting temperatures and the product is in a solid form. This characterizes direct reduction from other processes, such as a blast furnace, in which melting temperatures are attained and the products are molten slag and molten pig iron, usually called hot metal.

Although direct reduction is an old art, as stated hereinabove, it has played an insignificant role in the world's iron and steel industries until recently when a variety of excellent processes have been developed and commercialized. These processes can generally be classified into four types of reactor systems, with sub-classifications thereof based upon the required physical form of the iron ore feed, the type of reducing agent employed, and the physical form of the metallized product.

One such reactor system employs a moving-bed shaft furnace reactor that used iron ore agglomerates as the feed material formed from lump ore, pellets made from fine ore, or mixtures thereof. A preferred reducing agent for this system is gaseous mixtures consisting mostly of hydrogen ($H_2$) and carbon monoxide (CO) that is commonly produced by steam reforming of natural gas. Metallized product from this system is as agglomerates excepting for a generally small proportion of fine material that may have been created wtihin the reactor. An example of one such system is described by Schroer, C. A., and Clark, D. W., "Operating a Midrex Direct Reduction Plant—Current State of the Art," Iron and Steel Engineer, August 1976.

Another system, a fixed-bed shaft furnace reactor also uses agglomerates as the feed material, with gaseous reducing agents, and the metallized product is agglomerates. An example of such system is described by Gearhart, H. E. and Jackson, K. A., "Production of Metallized Pellets by the HyL Process," Iron and Steel Engineer, March 1974.

A third of the four systems involves a rotary kiln reactor that also uses agglomerates as the ore feed material with the product therefrom appearing as metallized agglomerates. The reducing agent in this system is preferably solid carbonaceous materials, such as low-volatile and non-coking coals, and is often augmented by natural gas or fuel oil. Two examples of this system are shown in Reuter, G., "Proceso SL/RN," and Krebs, E., "Proceso Krupp," both in Reduccion Directa en America Latina published by ILAFA in 1974.

With each of these three reactor systems the metallized pellets or agglomerates produced therein have serious problems with reoxidation and product instability during storage and transport. To passivate the product it has heretofore involved additional and costly processing procedures and equipment, such as that illustrated by Pietsch, W., "Storage, Shipping and Handling of Midrex Iron," Preprint No. 76-B-317, SME-AIME Fall Meeting, Denver, Colo., Sept. 1-3, 1976, which passification problems can be, to a large extent, solved by the present invention at minimal cost.

A fourth system utilizes fluidized bed reactors that handle an iron ore feed of fine solids rather than as agglomerates. Gaseous reducing agents for this system are preferably produced by steam reforming of natural gas. The product from such system appears as metallized fines and, prior to the process of the present invention, other processes have generally practiced high-temperature briquetting of that product to convert it entirely into stabilized metallized agglomerates. An example of such high-temperature briquetting was presented by the present inventor, Davis, W. L., Jr., et al, in an article entitled, "Briquetacion del Mineral de Hierro de Alto Tenor de Reduccion Directa en Lechos Fluidizados," in Reduccion Directa en America Latina published by ILAFA in 1974.

Production of metallized iron ore within a fluidized bed reactor system has been described in detail in an earlier application for United States patent entitled, "Method and Apparatus for Producing Metallized Iron Ore," Ser. No. 899,318. Therein was discussed the stringent requirements on the ores, the expense and complexity of ore preparation plants, the limitations on incremental scaleup capacity of production plants, the thermodynamic and kinetic limitations on reductant gas utilizations and the like. Also, the problems of stabilizing the product produced by such reactor system were discussed briefly therein, and a method for post-treating that product was claimed. This process involves, in a fluidized bed apparatus, the steps of passing cold inert gases counter-currently through a moving bed of metallized iron ore, spraying water over the bed to reduce the temperature, and drying the cooled metallized iron ore. The present invention improves and elaborates upon this procedure to include providing solutions for problems involved in treating, handling, storage and transport of metallized iron ore, as well as problems of utilizing metallized iron ore in certain iron and steel-making furnaces and operations.

Detailed discussions of these problems are provided by Greenwalt, R. W., and Stephenson, J.G., "The Role of Agglomeration in Direct Reduction Processes," Agglomeraion 77, published by the AIME in 1977 (American Institute of Mining, Metalurgical, and Petroleum Engineers, Inc.) and by Rollinger, B., "Steel via Direct Reduction," published in the January 1975 issue of Iron and Steelmaker (an AIME publication.

Generally for reactor systems that produce metallized pellets or metallized agglomerates, with time the products tend to reoxidize and liberate heat which reoxidation and heat liberation is also dependent upon the conditions of the product, such as whether it is wet or dry, or the like. If stockpile quantities are large, as normally are desired in the iron and steel industry, heat accumulates, internal temperatures rise, and spontaneous ignition may occur and continuous burning takes place. Moreover, if such material in stockpile comes into contact with moisture, reoxidation accelerates and hydrogen gas is evolved which creates an extremely hazardous condition in confined areas.

Where metallized iron ore is produced as fine sizes or powders, having large surface areas, expensive and complex high-temperature briquetting operations followed by briquette cooling, have been employed to stabilize the product. Such operations have required complete blanketing and purging of the product with inert gases to exclude atmospheric oxygen during the briquette forming process. The objectives of such briquette forming are to decrease the surface areas of fine particles by producing dense briquettes to presumably decrease the tendency of the material to reoxidize or be pyrophoric at room temperatures, with the second objective being to make dense agglomerates that presumably are more amenable for use in electric furnaces. In meeting these objectives, those skilled in the art have established stringent requirements that essentially 100 percent of the powder must be converted to briquettes, with all individual briquettes being of extremely high density so as to be immune from pyrophoricity, and having high strengths so as to withstand and minimize degradation and the generation of fine particles during handling. Such requirements, of course, add greatly to the complexity and capital costs of briquetting facilities. For example, extremely high operating and repair and maintenance costs are incurred because of relatively short service lives of briquetting rolls, roll pocket insert materials, and check plates at high temperatures. High cost of operations are all incurred because of the complex equipment needed for hot screening, inert gas purging, and the recycling of hot unbriquetted material to the briquetting machines. In fact, it is not unusual to note a "doubling-up" of equipment to provide 100 percent backup, and despite such doubling-up, the reliability and on-line availability of such facilities leaves much to be desired. Finally, the resulting briquettes are by no means completely immune to reoxidation. Although they are considerably more stable in storage than porous metallized pellets, care must still be exercised to avoid "critical stockpile heights" as discussed in the cited reference by Greenwalt and Stephenson.

Such complex and expensive agglomeration facilities and such operating problems are unnecessary and are eliminated in the practice of the present invention. As is covered later herein, the assumptions that have led to the described complex and expensive procedures and equipment for the handling of metallized iron ore are, at best, shown to be only partly valid. The present invention furnishes new insights and interpretations of scientific and technical data whereby greatly improved and simplified methods and apparatus are provided that eliminate instability and reoxidation problems for all types of metallized iron ore products, thereby greatly enhancing the versatility for use of such products in various iron and steelmaking furnaces and operations.

Within the knowledge of the inventor there has not heretofore existed an arrangement of apparatus like that of the present invention, nor a process for its use like that of the present invention, and therefore the present invention is believed to be both novel and unique.

SUMMARY OF THE INVENTION

It is a principle object of the present invention to provide apparatus and a method for its use for improved cooling and post-treatment of fine sizes or powder forms of metallized iron ore that emerge as product as elevated temperatures from fluidized bed direct reduction reactor systems, or the like.

Another object is to provide apparatus and a method for its use to render such metallized iron ore product, after cooling and post-treatment, immune from reoxidation and pyrophoricity problems during essentially unlimited time periods in storage and during handling and transport, regardless of its exposure to atmospheric oxygen and the conditions of weather it is subjected to.

Another object is to provide apparatus and a method for its use to render said metallized iron ore product, after cooling and post-treatment, immune from reoxidization and pyrophoricity problems as are promoted by contact with moisture, such as the generation of hydrogen ($H_2$) gas.

Another object is to provide apparatus and a method for its use that replace high-temperature agglomeration operations and facilities for handling of metallized iron ore in powder form.

Another object is to provide apparatus and a method for its use for simplifying procedures for high-temperature agglomeration operations, that involve lesser facilities than have heretofore been required.

Another object is to provide apparatus and a method for its use to stabilize metallized iron ore that employs in-plant generated inert gases from direct reduction plants for product cooling and post-treatment.

Another object is to provide apparatus and a method for its use to stabilize metallized iron are at a decrease in capital and operating costs by utilizing only the quantities of inert gases normally produced in direct reduction plants as a consequence of the most efficient mode of plant operation for iron ore preheating, and the like.

Another object is to provide apparatus and a method for its use to stabilize metallized iron ore that employs externally generated inert gases for product cooling and post-treatment that may and preferably do contain oxidizing components, reducing the required purity and quantities, thereby decreasing capital and operating costs for such external facilities.

Another object is to provide apparatus and a method for its use whereby metallized iron ore products from direct reduction reactor systems in pellet or agglomerate forms are rendered immune from reoxidation and pyrophoricity problems during essentially unlimited time periods in storage and during handling and transport, regardless of its exposure to atmospheric oxygen and the conditions of weather it is subjected.

Another object is to provide apparatus and a method for its use whereby said metallized pellets or agglomerates are immue from reoxidations and pyrophoricity problems as are promoted by contact with moisture, such as the generation of hydrogen ($H_2$) gas.

Another object is to provide apparatus and a method for its use whereby said metallized iron ore or agglomerates of metallized iron ore do not require expensive passivation treatments to render said products immune from reoxidation and pyrophoricity problems.

Another object is to provide apparatus and a method for its use whereby metallized pellets and agglomerates of metallized iron ore need not be subject to stringent requirements and specifications with regard to resistance to reoxidation and physical size degradation.

Still another object is to provide apparatus and a method for its use for eliminating low-temperature briquetting operations in direct reduction plant installations that produce low-temperature metallized pellet and metallized agglomerate products.

Still another object is to provide apparatus and a method for its use for eliminating high-temperature briquetting operations in direct reduction plant installations that produce high-temperature metallized pellet and metallized agglomerate products.

Still another object is to provide apparatus and a method for its use to provide stabilized metallized iron ore having substantially higher temperatures than could formerly be tolerated, such higher temperatures allowing increased operational flexibility and capital savings in facilities.

Still another object is to provide apparatus and a method for its use whereby metallized iron ore, or any size, shape or consistancy, is rendered immume from breakage and size degradation during handling and transport operations.

Still another object is to provide apparatus and a method for its use whereby metallized iron ore can be moved in a plant setting by pneumatic and hydraulic arrangements heretofore not considered practical by those skilled in the art, such arrangements improving the downstream and associated iron and steelmaking furnaces and operations.

Still another object is to provide apparatus and a method for its use for utilizing metallized iron ore products from various direct reduction reactor systems in conventional iron and steelmaking furnaces and operations for improving the efficiencies of such furnaces and operations.

Still another object of the present invention it to provide apparatus and a method for its use that is compatible with: existing fluidized bed and other direct reduction reactor systems and operations; commonly practiced mineral processing techniques; product and material handling procedures; and with conventional smelting and refining procedures, for increasing production of such existing facilities and improving efficiencies of operations thereof with minimum facility and equipment additions.

The present invention in an apparatus and a method for its use in the post-treatment, handling, storage, transport and use of metallized iron ore in iron and steelmaking furnaces and operations involves obtaining metallized iron ore from a reactor system or reactor systems with that product being in powder, pellet or agglomerate form.

The powder product received at elevated temperatures is first cooled and then post-treated, preferably in a fluidized bed operation. The fluidizing and partial cooling medium in such fluidized bed operation are preferably inert gases that are impure by virtue of containing oxidizing components, such as carbon dioxide ($CO_2$) and water vapor, ($H_2O$), with that cooling being augmented by liquid water sprays. The resulting product is thereby rendered immune form reoxidation when exposed to atmospheric oxygen during long term open storage and transport, and, moreover, the resulting product is immune from reoxidation with respect to weathering effects such as humidity and rainfall. Said product may be conveyed by convetional equipment, or by novel pheumatic means that employ air as a transport gas.

Additionally, said metallized powder product, whether at high or low temperatures, can be subjected to agglomeration operations, such as by briquetting. Such briquetting apparatus and operations will, however, substantially differ from conventional briquetting technology in that the present invention need not employ powder recycle facilities and indeed a controlled portion of residual powder is required by the present invention for combining with produced metallized product briquettes.

Alternatively said metallized powder product, whether at high or low temperatures, can be subjected to direct quenching in liquid water thereby allowing for a novel hydraulic transport means to be employed. Such wet powder can remain in submerged storage for substantial time periods and in that state will display essentially negligible reoxidation and generation of hydrogen ($H_2$) gas. Such wet powder, can then be subjected to drying operations, whereafter it can be handled by appropriate apparatus as disclosed for handling dry inert granular solids.

Metallized iron ore product as low temperature agglomerates are preferably subjected to crushing operations whereby a controlled portion of the total product is converted to the powder form, with the remaining agglomerates and the powder produced thereafter combined for handling, storage and transport.

Metallized agglomerate products having a high temperature are preferably subjected to agglomeration operations, such as by briquetting, with such apparatus and operations not employing powder recycle facilities, the resulting briquettes and powder, after cooling, to be combined with additional powder from external sources, for handling, storage and transport.

The present invention also involves combining the products from differing direct reduction reactor systems that produce metallized iron ore in powder and agglomerate form, or the products from a hybrid direct reduction facility such as that disclosed in my pending application for U.S. patent Ser. No. 899,318. Such combination, as produced by the apparatus and process for the present invention, results in a total product that is immune from reoxidation, the deleterious action of air, moisture, and size degradation during handling, storage and transport.

Metallized products handled as described hereinabove that are received at iron and steelmaking furnaces and operations, are further handled by additional apparatus and methods of the present invention that are provided to facilitate a utilization of this product for steelmaking by both conventional and novel arrangements of electric furnaces, open hearth furnaces, and oxygen furnaces, by combinations of agglomeration and by bin and pneumatic charging procedures. Further, the metallized iron ore product can, with the apparatus and procedures of the present invention, be utilized for ironmaking in blast furnaces by combinations of agglomeration and top charging and by pneumatic injection. Moreover, apparatus and a method for its use of the present invention provides wet product handling procedures and apparatus to allow for the processing of low grade iron ores, heretofore considered unsuitable for direct reduction operations, wherein secondary upgrading of metallized iron ore in a water slurry form is performed. Additionally, the apparatus and a method for its use of the present invention provides an arrangement whereby high temperature metallized iron ore in powder form is converted into blast furnace "super-agglomerates" that contain metallized iron, carbon, and fluxes sufficient for smelting and more efficient ironmaking.

Further objects and features of the apparatus and a method for its use of the present invention will become more apparent from the following detailed description taken together with the accompanying drawings.

THE DRAWINGS

FIG. 1, is a block flow chart showing R.O.M. (run-of-mine) iron ore being processed through a hybrid direct reduction facility;

FIG. 2, a schematic of a fluidized bed product cooler showing receipt of hot metallized ore from ore reducers being cooled and post-treated therein by inert gas and water sprays to stabilize the product for handling, storage, transport and optionally for blending with other direct reduction product forms;

FIG. 3, a schematic of a hot briquetting operation showing receipt of hot metallized ore powder from ore reducers being processed in a "once-through" briquetting operation, with the briquettes and powder cooled and post-treated by inert gas and water, the resulting material entering combined storage, or being screened for separate storage of powder and briquettes;

FIG. 4, a schematic showing bin charging of metallized iron ore powder into an electric furnace;

FIG. 5, a schematic showing the briquetting of metallized iron ore powder followed by charging into an electric furnace;

FIG. 6, a schematic showing lance injection by pneumatic transport of metallized iron ore powder into an electric furnace;

FIG. 7, a schematic showing the injection by pneumatic transport of metallized iron ore powder through the tuyeres of a blast furnace;

FIG. 8, a schematic showing the briquetting of metallized iron ore powder followed by charging of briquettes through the bell charging system of a blast furnace;

FIG. 9, a schematic showing the processing of hot metallized iron ore powder in a fluidized bed reactor combined with coal and lime, followed by a briquetting operation to produce blast furnace "super-agglomerates";

FIG. 10, a schematic showing pneumatic injection of metallized iron ore powder into a top blown BOF (basic oxygen furnace) for steelmaking;

FIG. 11, a schematic showing pneumatic injection of metallized iron ore powder into a bottom blown BOF for steelmaking;

FIG. 12, a schematic showing post-treatment by water quenching of hot metallized iron ore powder followed by slurry transport and handling;

FIG. 13, a schematic showing receipt, handling, and processing of metallized iron ore in slurry form; and FIG. 14, a schematic showing secondary upgrading of metallized iron ore whereby such materials are processed principally by grinding and magnetic apparatus to remove gangue constituents that are deleterious in iron and steelmaking furnaces and operations.

DETAILED DESCRIPTION

Figure 8:
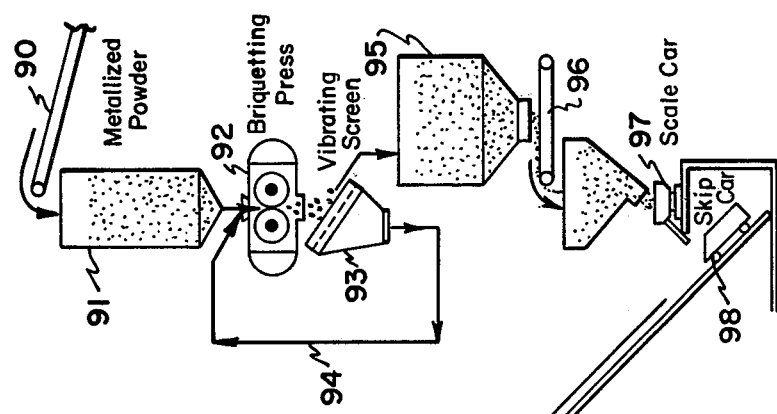

Referring now to the drawings:

A utilization of the apparatus and a method for its use of the present invention involves obtaining metallized iron ore product hereinafter referred to as product, from one or more direct reduction facilities. Such direct reduction facilities can produce either, or both, powder or agglomerate products, and such product may be either at high or low temperatures. Such product may be obtained from independent facilities, or from a hybrid direct reduction facility. For purposes of illustration, FIG. 1 shows a hybrid facility in block schematic as was disclosed in my pending application for U.S. patent Ser. No. 899,318, with that portion associated with product handling being the subject of a portion of the present invention.

Shown in FIG. 1, R.O.M. (run of mine), iron ore 17 is metallized to a desired degree in a direct reduction plant 18, and then preferably undergoes post-treatment at 19. Post-treatment 19 preferably involves apparatus and processing whereby the metallized ore is cooled to controlled temperatures, preferably by passing inert gases shown at 19a, thereover. The inert gases shown at 19a are preferably generated within the direct reduction plant 18 for reasons of proximity and economy, but optionally may be supplied by an external inert gas generating facility.

The product produced in the apparatus and with the method of the present invention, as will be described in detail later herein, receives post-treatment at 19 so that rapid product reoxidation will be prohibited, or limited, the product thereafter being capable of remaining at its high metallization level during handling, storage, and transport.

As shown at 21a and 21c in FIG. 1, the metallized products, pellets, agglomerates, and powder, shown as arrows 14a and 19b from direct reduction plants 14 and direct reduction fluidized bed process 18 are separately stored and transported. In which situation, an optional passivation procedure 20, shown as a broken line box, may be required to prevent reoxidation of metallized pellet product 14a during storage and transport. However, as shown at 21b, where the individual products from both direct reduction plants, as metallized pellets and metallized powder, are combined into a total product, such total product by a process of the present invention is made immune from reoxidation, effectively eliminating, thereby, the need for passivation procedure 20.

To fully appreciate the novel features of the present invention, prior technical discussion is presented as follows:

Aspects of Metallized Iron Ore Reoxidation

The first objective of any procedure for handling and use of metallized iron ore is obviously to protect the product from reoxidation, beginning where the product is produced at the reduction plant and ending with that product being charged into an iron and steelmaking furnace. The second objective is to have the material in a form or forms that are acceptable for charging into a particular iron and steelmaking furnace intended to receive that product. With the above objectives in mind, the new and improved apparatus and methods for its use of the present invention are developed after a re-evaluation by the present inventor of the validity of certain assumptions involved with the production and maintenance of product were found lacking.

It is well known to all persons associated with direct reduction plants that their products are highly reactive when emerging at elevated temperatures and rapid burning of that product occurs when it is exposed to air. It is however, not generally recognized that metallized iron ores, particularly those in powder form, are relatively stable in air provided they are first cooled to near room temperature in an inert or reducing gas atmosphere. Heretofore, most prior direct reduction processes, unlike the present invention, involved product cooling, either within reduction reactor, or immediately after discharge, and often employed complex and expensive passivation procedures or high temperature briquetting operations. The present inventor rejecting the assumptions on which these prior procedures and processes were based, has determined that the following several factors are the major factors that affect the degree of stability of metallized iron ore when exposed to atmoshperic oxygen:

Reduction of Temperature

Ores reduced at higher temperatures are more stable after cooling than those reduced at lower temperatures. To achieve appreciable stability, product reduction must be accomplished above the thermodynamic "quadruple point" of 560° C. (1040° F.) where metallic iron ore can co-exist with its various oxides. Below this temperature magnetite ($F_3O_4$) can be reduced to iron (Fe) without formation of wustite (FeO). This was the basis for a process of some years ago commonly known as the H-Iron Process, using very high pressure fluidized bed reactors and very low reduction temperatures of about 480° C. (900° F.). Its product was a powder that was extremely pyrophoric, even at room temperatures. A reference to this process and product is shown in an article by Banning, L. H. and Fursman, O. C., entitled, "Melting Pyrophoric Hydrogen Reduced from Powder for Production of Steel," U.S. Bureau of Mines Report of Investigations, No. 6405 (1964). The product of this H-Iron Process required pressure compaction, reheating the compacts to higher temperatures and cooling in an inert atmosphere. Such experiences with H-Iron process product doubtlessly discouraged others from questioning the need for compacting or briquetting of metallized iron ore powders to presumably make them more resistant to reoxidation. The present inventor has determined however, that the very reactive properties of materials such as H-Iron powder are irrelevant and erroneous when applied to modern high temperature fluidized bed processes that operate substantially above the "quadruple point" temperature. Thus, no technical reasons exist for briquetting such reduced iron ore powders for the sole purpose of making them less reactive after cooling to room temperature and during bulk storage. In fact, agglomerates such as those resulting from hot or cold briquetting of metallized iron ore powders are far more reactive in bulk storage than is the same material in powder form. The reasons for this pnenomenon will become more clear from the following discussion of the particle size aspect.

Particle Size

Fine particles obviously expose relatively more external and internal surface areas to atmospheric oxygen than do agglomerates. Therefore, the finite rate of reoxidation that occurs for all exposed metallic iron surfaces will presumably be accelerated for finer sizes. However, regardless of reoxidation rate, which generally will be small at room temperatures, reoxidation cannot proceed unless air and its contained oxygen surrounding a particle is replenished. If this does not or cannot occur, the surrounding atmosphere becomes all nitrogen then reoxidation must stop.

A bulk storage pile of metallized powder consists of potentially reactive individual particles. However, the particles are of random sizes that might range between 6.3 mm × 74 microns (¼ in. × 200 mesh), and smaller, for natural ores. Therefore, the volumes and voids between larger particles are filled with smaller size particles and between these are still smaller size particles. Thus, the distances and interstitices between these randomly packed particles are only small fractions of a millimeter, and the material has negligible permeability and porosity for natural diffusion of air into the interior. Moreover, if oxygen in entrapped air within the interior voids should completely react with the metallized particles, the temperature rise would be a maximum of 3° C. (5°

F.). Such temperature rise is obviously harmless and the corresponding loss of metallic iron would not be detectable by conventional analytical methods. Therefore, the safe and reliable long-term storage method is to leave the material in powder form. To attest to this method's reliability the present inventor has determined that regardless of stockpile size, it is not possible to deliberately set a pile of metallized iron ore on fire with a direct flame. If a flame is directed onto a storage pile, the area under the flame will become incandescent and reoxidizes. When the flame is removed the affected area cools and reoxidizes, it has been found, does not spread to surrounding surfaces nor into the pile interior. The net result is that only the area directly under the flame is affected and only to a negligible depth. In the rare case where metallized powders are closely sized such that the permeability is appreciable for air to diffuse into the interior, a simple grinding operation, generally of only a minor portion thereof, followed by re-blending will solve the problem.

The inertness and stability of cooled metallized powder has been found, therefore, to provide the basis for the development of the special apparatus and methods for the post-treatment, handling, storage, transport and final usage of the present invention of metallized iron ore product, in iron and steelmaking processes.

Figure 2:
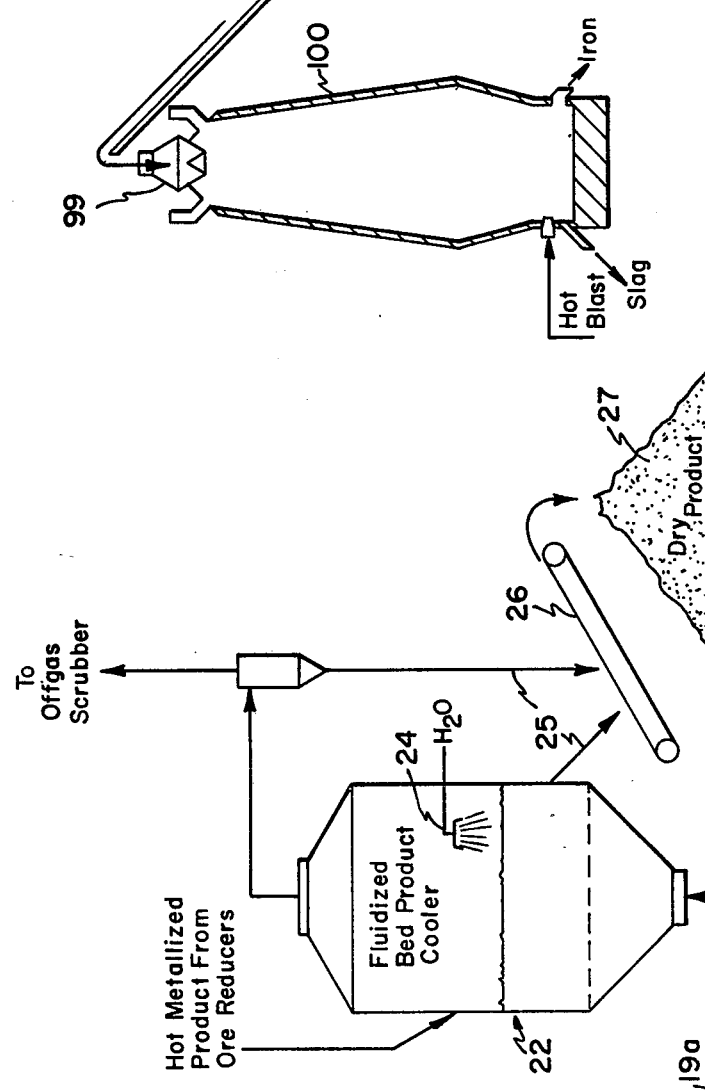

As mentioned earlier herein, metallized iron ore product in powder form may be obtained from the apparatus and by the method described in my pending application Ser. No. 899,318, or from existing direct reduction facilities employing processes that generally include fluidized bed reactors. These products can be handled by conventional techniques, involving briquetting of metallized powder, the recycling of unbriquetted material so as to convert essentially 100 percent thereof into the agglomerate form, and then cooling of the briquettes prior to storage and transport. As also discussed earlier, such conventional techniques to produce 100 percent agglomerates, have the effects of changing an inert and stable material into forms and conditions that are unstable and susceptible to reoxidation and burning during storage when exposed to atmospheric oxygen and moisture. It is these phenomena that have not been recognized by those skilled in the art, with the present invention employing, preferably, inert gases generated in an associated direct reduction facility, or in external inert gas facilities, to directly post-treat, cooling & passivating to stabilize the metallized iron ore powders. FIG. 2 illustrates an example of such post-treating as involving cooling of hot metallized powder to 150° F. to 300° F. (65° C. to 150° C.) in a fluidized bed apparatus 22 with cold inert gases entering thereto through line 23, from associated direct reduction plant stream 19a of FIG. 1, or from an external inert gas facility. Cooling of that powder is shown augmented by water spray 24. The product 25 moves therefrom by conveyor 26 to dry product storage 27. Carbon dioxide ($CO_2$) and water ($H_2O$), when momentarily in contact with hot metallized powder, cause a slight surface reoxidation providing thereby additional passivation during this post-treatment operation. The resulting powder, when so treated, can be stored in the open for years, as as 27, with negligible loss of metallization. This storage capability is in stark contrast to the assumption that metallic powders with large exposed surface areas will by pyrophoric and rapidly oxidize.

In the apparatus and the method as heretofore described, as illustrated in FIG. 2, hot metallized powder enters cooler 22 at elevated temperatures that are in the order of 1200° F. to 1500° F. (649° C. to 816° C.) and higher. At such temperatures metallic iron will rapidly reoxidize in the presence of free oxygen, but appreciable reoxidation will not occur in the described apparatus and with the method of the present invention in that the particles as they are introduced come to the indicated bulk fluidized bed temperature within a matter of seconds. Further, the inert gas composition for use in the present invention involves a maximum of one percent free oxygen. This requirement presents no technical or operational problems, because, for example, conventional inert gas plants readily meet this requirement without special features and control techniques. The requirements dealing with carbon dioxide ($CO_2$) and water vapor contents for appropriate inert gases are fortunately arbitrary.

Although oxidizing components tend to slowly reoxidize metallic iron at both high and low temperatures, a slight surface reoxidation in the product cooler 22 is desirable for additional passivation. In practice the extent of such metallization loss is generally undetectable by conventional analytical procedures. Thus, appropriate inert gases for post-treatment and cooling may contain any desired proportions of carbon dioxide and water vapor, thereby eliminating the need for additional gas purification equipment. Such flexibility as to amounts of carbon dioxide and water vapor content that may be in the inert gases useful for practicing the present invention means that a small inert gas facility only is needed for a large production capacity cooler. In effect, only gas quantities sufficient for fluidization of the bed of solids in product cooler 22, are needed, with the major portion of the heat removal during product cooling performed by water sprays 24. Thus, considerable capital and operating costs can be saved by the present invention that minimizes the size of an inert gas facility and eliminates the need for gas purification equipment. In contrast, conventional technology, such as that employed for product cooling in a conventional briquetting facility, will require inert gas quantities sufficient to perform the entire heat removal duty. Moreover, such inert gas composition will usually be specified as essentially pure nitrogen, thereby requiring expensive carbon dioxide scrubber equipment for use for inert gas purification.

It should be noted in FIG. 2, the bed and product temperatures are in the 150° F. to 300° F. temperature range, although lower temperatures are certainly obtainable, if desired. This temperature range is in sharp contrast to considerably lower final porduct temperatures heretofore considered as necessary for metallized iron ore. The previously cited reference by Greenwalt and Stephenson summarizes conventional technology as "the products of all processes must be cooled to less than 50° C. (121° F.) before becoming exposed to air." In practice with the method and apparatus of the present invention, the final product temperature is not dictated by reoxidation considerations resulting from exposure to air, but rather by the characteristics of downstream handling equipment, as for example, if an operator, not shown, wishes to avoid problems such as burning of rubber conveyor belts.

In FIG. 2, the storage pile of dry product 27 is meant to show open storage of any desired quantity and height. No covering is shown or needed to protect the material from weathering effects. Further, there are no concerns with a "critical stockpile height" that might promote reoxidation, heat accumulations and temperature increases that could cause spontaneous ignition and burning of stockpiles. Thus, metallized powder may be stored in the manner of the present invention for years, if desired, with negligible loss of metallization. Moreover, rainfall affects only the top few inches of the surface layer forming a protective crust thereover with the material underneath unaffected.

The stability and inertness of metallized powder of the present invention will prevail during handling and transport by any conventional means. Thus, conventional equipment for handling granular solids may be employed, such as conveyor belts, front end loaders, trucks, rail cars, electromagnets, or the like, not shown. Additionally, unconventional handling means and equipment may be employed. In this regard, pneumatic transport equipment and pipelines are completely feasible for transporting the inert metallized powder of the present invention using air as a conveying gas. Such application has heretofore not been considered for handling metallized iron ore that has erroneously been presumed to be unstable in contact with atmospheric oxygen. Thus, considerable savings are now possible by employing conventional pneumatic conveying as is presently done for cement, food grains, and the like, for loading into rail cars, ocean-going ships, and other transport.

Block 21b in FIG. 1 indicates a co-mingling of metallized powder with metallized pellets whereby the expensive passivation treatment for pellets shown by dotted block 20 can be eliminated. In practice, when such pellets and powder are co-mingled to form a common stockpile, the post-treated and cooled metallized powder falls on the pellet stockpile, cascading thereover and through to fill the large interstices and void volumes between the pellets. When this occurs, the permeability of the agglomerate stockpile is destroyed, air cannot diffuse into the interior, and the entire stockpile becomes as stable as metallized powder alone. To reclaim and separate the agglomerates from the powder, if desired, a simply screening operation will suffice.

For occasions when there is insufficient metallized powder to provide stockpile coverage of such metallized agglomerates, the fines or powder generated during, for example oxide pellet reduction, can be used. In addition, pellets can be deliberately crushed, as required, to provide sufficient powder or fines for stockpile coverage. Alternatively, metallized agglomerate stockpiles can be covered and protected by ordinary silica sand, with future reclaiming and separation done by screens or electro-magnets.

It is not the intention of the present disclosure to question the role of briquetting as a viable process for agglomerating metallized iron ores, or other materials. Instead, criticism is directed to the application of briquetting for extremely reactive materials, at elevated temperatures, that involve difficult and complex and costly operations for maintaining all components under an inert atmosphere, and requiring that essentially 100 percent of the product be as briquettes that meet stringent density and strength specifications. As heretofore discussed, these conditions require complex recycling facilities for unbriquetted material, and, in existing facilities, despite having 100 percent spare briquetting capacity, hot briquetting often becomes a close-coupled bottleneck of production that adversely affects operation of a reduction system. While metallized briquettes are strong and dense, withstanding handling very well and much better than metallized pellets, breakage and fines generation will still occur to preceptible extents depending upon the number of required handling steps. Thus, the problem of handling both agglomerates and fines would still exist at a consuming iron and steel plant. Degradation of metallized pellets, which are far weaker than briquettes, is a far more severe problem. Moreover, for briquetting, when the total product, originally as powder, is converted completely into agglomerates, their versatility is automatically limited to select iron and steelmaking processes, as will be described later herein.

As the method and apparatus of the present invention eliminates the need for converting 100 percent of metallized powder into the agglomerate form, the need for expensive, complex, and troublesome hot-fines recycle facilities are eliminated in the application of briquetting technology.

In FIG. 3 is illustrated apparatus and a process of the present invention whereby briquetting is performed on a "once-through" basis. Shown therein, hot metallized powder 30 from ore reducers enters a surge bin 31. Therefrom, that powder passes through briquetting press 32 that produces a mixture of briquettes and unbriquetted material that is then passed into a rotary cooler 33. That material is then cooled by a combination of inert gas 34 and water as a spray 34a, in a manner as previously described with respect to FIG. 2. A rotary cooler 33 is preferred for this arrangement rather than a fluidized bed cooler inasmuch as this equipment is more suitable for handling agglomerates. As shown by line 35, the post-treated and cooled material may go directly to combined storage 36, where the unbriquetted material that remains as a powder, fills the voids in the storage pile, effectively destroying its permeability to diffusion of air, with the entire material thereby protected from reoxidation. As indicated by lines 37 and 38, pellets or powder from associated or remote direct reduction facilities may also be incorporated into the combined storage 36. Further, as indicated in FIG. 3, it may at times be desired to separate residual powder from briquettes and to form separate storage piles. This operation is best performed by a conventional vibrating screen 39, for transport by conveyor belts, or the like, as indicated by lines 40 and 41, the materials passed to storage piles 42 and 43.

In the apparatus and method as described and illustrated in FIG. 3, the critical parameter for complete protection of the product from reoxidation in open storage is that there be sufficient powder present for destroying the permeability of combined storage pile 36. The required quantity for complete filling of void volumes between briquettes, or pellets, is approximately 30 to 36 percent by either weight or volume. However, complete filling of the void volumes is unnecessary to render the storage pile impermeable to air diffusion into the interior, and generally about 10 percent will suffice. In practice briquetting operations on a "once-through" basis will inherently produce initially about 10% unbriquetted material, and this quantity increases with operating time as briquetting roll materials deform. Usually for economic and technical reasons a briquetting press is removed from service for maintenance at about a 30 percent level of unbriquetted material.

Metallized Product in Iron and Steelmaking

As previously described, disclosure of post-treatment apparatus and a method for handling the products of various direct reduction processes as metallized powder, metallized agglomerates, and when the same are co-mingled, provides for the ability to handle, store and transport such materials without loss of their economic values through loss of metallization, is without detrimental degradation, and is without hazards to personnel and equipment. Additional disclosures that follow refer to the usage of such metallized materials upon receipt into stockpile at consuming iron and steelmaking furnaces and operations.

Electric Furnace Shops

FIG. 4 illustrates apparatus and a method for utilizing metallized powder upon its withdrawal from a stockpile of an electric furnace shop. As shown therein, metallized powder is preferably moved by conveyor 45 into an elevated feed bin 46 that provides surge capacity. The powder then feeds by gravity through chutes 47 into electric furnace 48 where it enters through the top, falling into molten bath 49, in proximity to electrodes 50. The metallized powder absorbs energy from the electrode arcs, radiant energy from the furnace roof, and from sensible energy in the molten bath. Melting occurs and the metallic iron enters the metal layer and gangue constituents enter the slag layer therein not shown.

Such a procedure as illustrated hereinabove, has not heretofore been practiced in electric furnace iron and steekmaking, in that the operators, and those knowledgeable in the art, have considered it a necessary precondition that charge materials be essentially completely in the agglomerate form. The reasons cited for this assumption, as discussed in the reference by Rollinger, (in the prior art section hereinabove), are rapid erosion of sidewall and roof refractories, higher electrode consumption, and heat transfer considerations such as where agglomerates penetrate the slag layer and, during melting, promote a boil, and the like. However, the present inventor has determined that such problems can be avoided with either batch or continuous charging of metallized powder with moderate changes in electric furnace operating practices, such as during meltdown, charging procedures for other materials such as fluxes and steel scrap, and in electrode energy input. In fact, such practices of smelting powders, although not presently performed in iron and steelmaking electric furnaces, are common in the non-ferrous industry where, for example, copper concentrates in powder form, are conventionally and routinely charged continuusly and smelted in electric furnaces. In FIG. 4, for clarity of illustration, common ancillary facilities in an electric furnace shop, such as those for scrap and flux charging, tap holes and ladles, electrical switchgear, and the like, are not shown.

Figure 5:
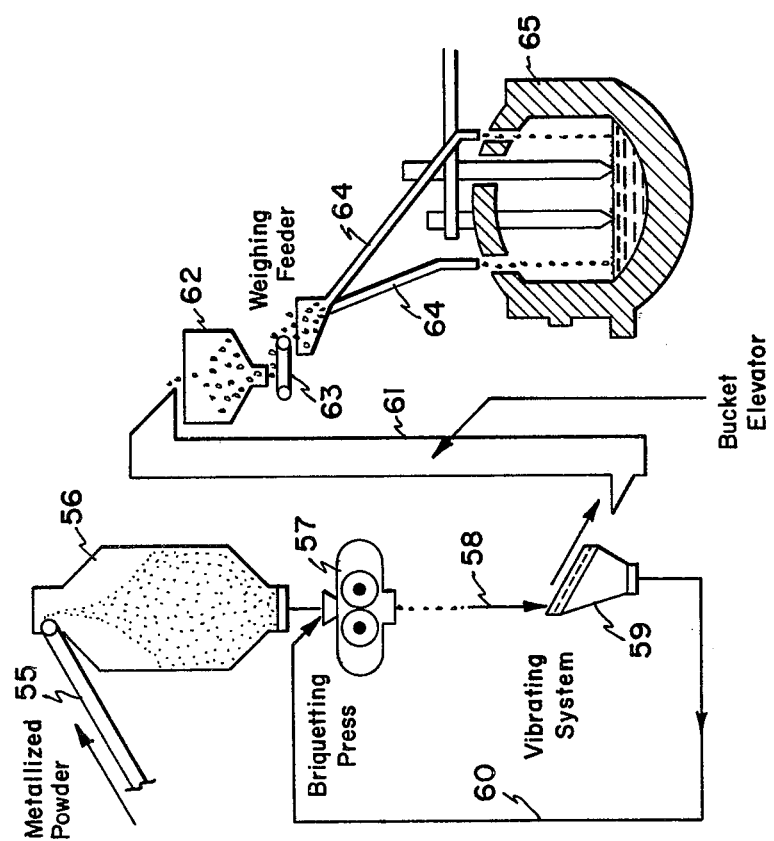

Recognizing that electric furnace melt shop practices very widely within the industry, and often between operators in the same shop, FIG. 5 is included to provide flexibility for employing metallized powder. FIG. 5 shows the use of such material with incorporated agglomeration facilities. In the apparatus and method shown in FIG. 5, metallized powder is moved by conveyor 55 into a feedsurge bin 56, and from there into and through briquetting press 57, from where briquettes and unbriquetted material emerge as indicated by line 58. An optional vibrating screen 59 separates out fine material 60 that are then recycled, to the briquettes press 57. The briquettes and coarse materials then pass, via elevator 61 to surge bin 62, and are fed by weighing feeder 63 through chutes 64 into electric furnace 65 according to particular and desired shop practices. Although the apparatus and method as described and illustrated in FIG. 5 appear conventional, in that briquetting of cold powders is widely performed, such practice has not heretofore been utilized in the iron and steel industry. This is mainly because the feasibility of storage, transport, and acquiring metallized iron ore powder without reoxidation problems had not heretofore been recognized. It is, moreover, emphasized that, the briquetting installation, as illustrated, would generally not require binding agents for admixture with the powder, as is common for low temperature briquetting operation, to enable producing strong briquettes. Instead, only sufficient strength is required to withstand the close-coupled handling operations as illustrated in FIG. 5. Binding agents appreciably increase the costs of briquette production, and such agents add impurities in an electric furnace to add "heat" thereto and appreciable costs for their removal. In FIG. 5, the briquetting facilities are deliberately shown as being close-coupled to the electric furnace installation. This is because, unlike material that remains as inert powder, briquettes produced from such inert powder become susceptible to reoxidation and burning of stockpiles unless covered by such inert powder or by other inert powders such as silica sand, as previously disclosed, and need to be utilized as soon as possible if they are not so covered.

In FIG. 6 is shown apparatus and method that involves an alternative arrangement for charging metallized powders into an electric furnace. Shown therein, metallized powder is moved by conveyor 70 into a storage vessel 71 and thence into a pressurized injector vessel 72. This arrangement allows for a continuous pneumatic conveying at controlled rates of metallized powder through line 73 and through lance 74, and into the molten bath contained in electric furnace 75. The pnuematic injection of various granular solids through water-cooled lances into iron and steelmaking furnaces is conventional, with such practices usually confined to the addition of small quantities of materials, such, as for example, graphite for recarburization of the "heat", and materials, such as lime or calcium carbide for desulfurization. However, prior to the present invention, no practice existed for injecting a major portion of a metallic charge into an electric furnace by rapid pneumatic transports. Moreover, as shown in FIG. 6, the transport gas 76 may be air, and, if desired to avoid nitrogen contamination of the electric furnace "heat", it can be commercially pure oxygen as is now used in some iron and steelmaking operations. Heretofore, those skilled in such operations have not considered it possible to use metallized powders, because of reoxidation problems in handling and transport thereof, such materials were believed to be unsuitable for direct use as powders in such furnaces, and also it was thought that such presumed unstable materials could not be conveyed by oxygen containing gases such as air, or indeed that such conveying could be safely accomplished with essentially pure oxygen.

Blast Furnace Ironmaking

FIG. 7 illustrates apparatus and a method for utilizing metallized powder in the blast furnace process for ironmaking. Metallized powder is reclaimed from storage and moved by conveyor 80 into storage vessel 81 and thence into a pressurized injector vessel 82, which arrangement provides for continuous pheumatic conveying at controlled rates of the material through line 83 and through tuyeres 84, such tuyeres being connected to the bustle pipe, hot blast mains, and stoves not shown of a blast furnace 85.

The injection or conveying gas 86 may be pressurized air augmenting air from hot blast mains, not shown. Alternatively, as heretofore described relative to electric furnace injection of metallized powder, such conveying gas may be commercially pure oxygen as is occasionally employed to increase the driving rate and productive capacity of a blast furnace. The quantities of metallized powder that may be so transported are calculable by those knowledgeable in blast furnace operations. Such calculations generally depend upon the extent of metallization of the injected powder, temperature of the hot blast air, physical and chemical characteristics of the burden materials (iron ore, coke, and limestone), whether auxiliary fuels are also injected through the tuyeres, such as natural gas or fuel oil, the furnace top pressure, and the operating characteristics of the particular blast furnace.

Metallized powders cannot be top charges to blast furnaces through the bell system thereof as agglomerates must be employed in such charging to avoid plugging the stack, creating gas flow abnormalities, such as channeling and bypassing of gases through the burden. FIG. 8 illustrates apparatus and a method employing close-coupled agglomeration facilities to provide a metallized product suitable for such bell system charging. Shown therein, metallized powder is reclaimed from stockpiles and moves by conveyor 90 to surge bin 91 from whence it passes through briquetting press 92. Emerging briquettes and unbriquetted powder from the briquetting press 92 are separated by vibrating screen 93 with fine materials recycled through line 94, as shown. Briquettes enter surge bin 95, and travel therefrom to belt feeder 96 and scale car 97, moving then into skip car 98, that conveys them to bell charging facilities 99 at the top of blast furnace 100. The briquettes, along with conventional burden materials, are smelted and the products emerge from blast furnace 100 as iron (hot metal) and slag.

The charging of metallized iron ore agglomerates through the top of a blast furnace is commonly known in the industry as the use of pre-reduced burden materials. While such practice is conventional, the close-coupling of agglomeration facilities, like those shown in FIG. 8, has not heretofore been contemplated, allowing thereby for a usage of metallized powders to obtain the advantages, as previously discussed herein, in the handling, storage and transport of such powders. Moreover, such close-coupling agglomeration facilities generally require no expensive binder agents as conventionally are used in low temperature briquetting operations to impart strength to the briquettes. Binding agents, however, could be used in the apparatus and in the practice of the present invention without departure from the scope of this disclosure. The present inventor determined that briquettes of sufficient strength can be produced by the application of pressure alone in a briquetting press. The resulting agglomerates, from such pressing, although relatively weak in comparison, whether produced with binders or in remote high temperature briquetting operations, are still sufficiently strong to withstand appreciable degradation in a blast furnace stack. In effect, such briquettes are rapidly heated in the blast furnace stack to temperatures in excess of 1200° F., whereupon grain growth occurs between compacted metallized particles that promotes strength. Such agglomerates will thereby withstand degradation until melting temperatures are attained in the lower regions of the stack.

Blast Furnace "Super-Agglomerates"

The ideal or "super-agglomerate" for blast furnaces would be pre-reduced, self-fluxing with residual iron oxides to be self-reducing by contained carbon. This implies that agglomerates having controlled degrees of pre-reduction and controlled carbon and flux contents. FIG. 9 shows a fluidized bed reactor 106 receiving hot powder shown at arrow 105 that has desired and controlled degrees of metallization from an appropriate direct reduction plant into the reactor 106, which powder is mixed with controlled quantities and sizes of coal shown at arrow 107 and lime or limestone 108. A fluidized bed 109 is thereby created and maintained by an inert gas stream 110 entering the reactor 106 from sources similar to those referred in FIG. 2, apparatus 10 acting as a fluidized bed product cooler. A water spray 111 is directed onto fluidized bed 109 for temperature control, which product temperature is generally lowered to a range of 400° F. to 700° F. (200° C. to 370° C.). In this temperature range volatile matter and coal tars contained within coal 107 soften and become plastic and serve as binders for the final briquettes, which briquettes will thereby have excellent strengths. Discharge material 112 from the fluidized bed 109 will be at a controlled temperature and will contain controlled proportions of the three feed materials. This mixture is then passed into a surge bin 113 for feeding into a briquetting press 114. The press 114 forms briquettes of that mixture that then enter temporary storage 115 for storage until they are transferred for feeding into a blast furnace like that described with respect to FIG. 8. This agglomeration facility must minimize the quantities of fines or unbriquetted material. Therefore, while not shown in FIG. 9, it should be understood that the briquetting press 114 preferably includes the briquette recycle facilities as are illustrated in previous FIG. 8 including a vibrating screen 93 and recycle stream 94, and the like. Moreover, a conventional briquette cooler, no shown, may be required, inasmuch as product briquettes are at moderately high temperatures, but has not been included with FIG. 9 for clarity of illustration but it should be understood that such could be included without departing from the subject matter coming within the scope of this disclosure.

The potentially large advantages and economies that accrue from blast furnace "super-agglomerates" containing pre-reduced iron ore, carbon, and fluxes have been long discussed by operators and research personnel knowledgeable in iron and steel operations. However, until the present invention appropriate technology has not heretofore been available. The closest technology, of which numerous references exist in the literature, refer to the production of agglomerates containing iron ore (not pre-reduced), coal, and limestone, commonly known as O-C-S briquettes. However, even these briquettes are not readily available to the industry inasmuch as only small bench scale and pilot plant operations have thus far been initiated. Such small scale facilities have demonstrated that such production of O-C-S briquettes is complex and uneconomical. In contrast thereto, the present invention now makes such production relatively simple as to the apparatus required and is technically feasible in its method. Moreover, the present invention provides for the employing of either fine iron ore or iron ore that is pre-reduced and metallized to desired degrees.

The facility shown in FIG. 9 may be close-coupled to a direct reduction plant to obtain metallized powder at the previously defined high temperatures. Alternatively, metallized powder may be withdrawn from an adjacent open stockpile at low temperatures, in which case a powder heating operation, not shown, such as in an additional fluidized bed unit, is employed.

Oxygen Steelmaking

Iron is conventionally charged into BOP or BOF (basic oxygen process or furnace) steelmaking vessels as batch charges of hot metal (molten pig iron from blast furnaces), and as relatively large pieces of cold iron or steel scrap. Fluxes, such as lime, are added thereto and oxygen is injected in a generally continuous manner, through water-cooled lances, to oxidize carbon and silicon from the molten bath during steelmaking and refining. Oxygen blowing continues until final molten steel specifications are met with only accasional turndowns for sampling to check the chemistry of the "heat" and for additions of alloying materials.

Generally, the heat balance of an oxygen steelmaking furnace results from balancing the heat generated by oxidation of carbon and silicon in hot metal with heat being absorbed by melting the cold scrap. This allows for approximately 30 percent of scrap additions relative to the quantity of hot metal. Time is consumed for such batch charging of scrap and for meltdown at the beginning of a heat and often during a turndown. Despite these delays, modern BOF shops achieve charge-to-tap heat times of approximately 30 minutes in comparison to heat times of several hours for the conventional open hearth steelmaking process. A significant advance in steelmaking would occur if these inherent time delays could be shortened in oxygen steelmaking shop practice, which desirable time shortening is provided by the apparatus and with the method of the present invention.

Figure 10:
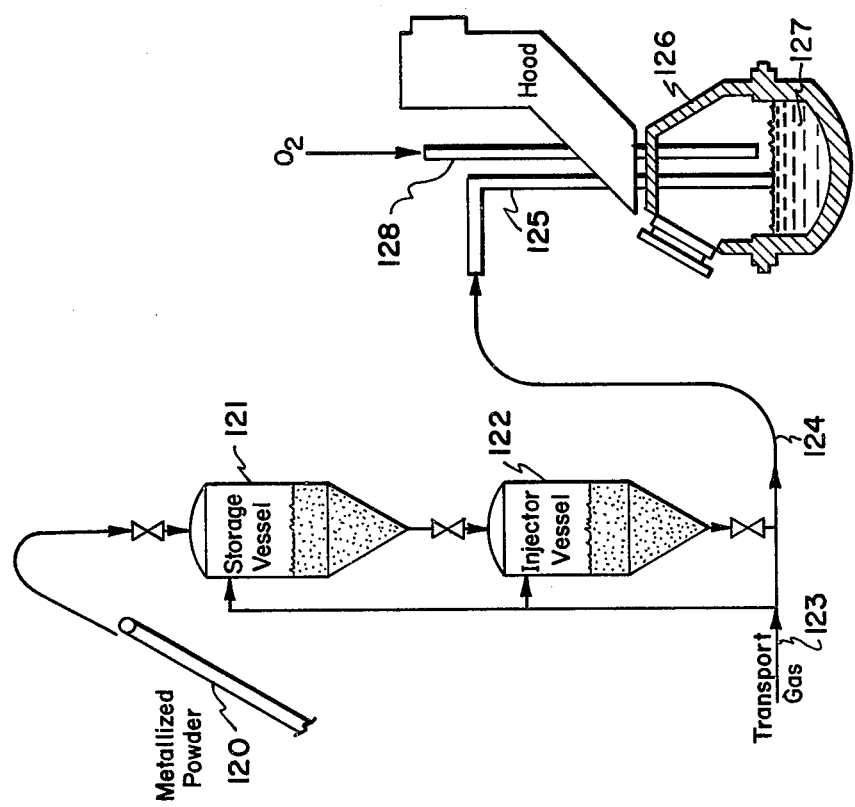

In FIG. 10 is shown metallized powder arriving at the facility as from a stockpile, or the like, via conveyor 120 and is deposited into a storage vessel 121. From vessel 121 it travels into injector vessel 122, whereupon it is pneumatically transported, by transport gas, shown as arrow 123, through line 124 to an auxiliary water-cooled lance 125 within a top-blown oxygen steelmaking furnace 126. The lance 125 is movable and can be lowered into top-blown oxygen steelmaking furnace 126. In this manner, metallized powder is injected into the molten bath at controlled rates according to the progress of the heat. As previously discussed, the transport gas, arrow 123, may be commercially pure oxygen. In which case, such gas augments that oxygen passing through a second water-cooled lance 128. Alternatively, said auxiliary lance 125 can be eliminated, said metallized powder connected to the furnace 126 as it enters through lance 128, thereby providing for a simplified installation. The apparatus and method of the present invention shown in FIG. 10 provides for considerable flexibility and a number of operational advantages that are not presently available in standard BOP or BOF shops. For example, in addition to a use of metallized powder that has not heretofore contemplated, metallized powder may be substituted for all or a portion of the metallics in cold scrap charges, which metallized powder may be continuously injected during oxygen blowing. Such controlled injection also provides for temperature control to achieve more constant molten bath temperatures during the heat, thus improving on both a control of the chemistry of the molten bath and providing a decrease of the heat times by virtue of decreasing the intervals and numbers of turndowns. An additional major advantage is that improved bath temperature control substantially increases the life of vessel refreactories, which is also a material improvement inasmuch as BOP refractory erosion is a major problem that greatly affects steel production costs. Presently, such furnaces obtain from perhaps 100 to 500 heats before a relining is required. The substantial increases in the number of heats before such relining as provided by the apparatus and with the method of the present invention, thereby can greatly lower steelmaking costs.

Within the past decade a variation in oxygen steelmaking apparatus has been commercialized that allow for bottom oxygen blowing, referred to in the industry as the Q-BOP furnace or process. The Q-BOP provides certain process advantages, with its main feature being that it permits such furnaces to be installed in existing open hearth shop buildings. This allows thereby for existing charging equipment, aisles, platforms, cranes, and ladle handling equipment to still be used. Thus, the conversion of an obsolete open hearth shop into a more modern oxygen steelmaking facility can be accomplished in a more economical manner.

The theoretical advantages of a bottom-blown oxygen steelmaking furnace were known for many years, but it was not commercially employed until recently because of problems of the extremely high temperatures generated by oxygen injection under the molten bath, at the furnace bottom, resulted in a very short unacceptable life for the bottom refractory lining. The improvement that permitted acceptable bottom refractory life was the development of special oxygen injection pipes or tuyeres that pass through the furnace bottom refractories. These tuyeres, now well known in the technical literature and generally consist of double pipes. Oxygen passes through a center pipe with the surrounding pipe passing a hydrocarbon gas therethrough. The hydrocarbon gas, often called a "shroud" gas, cracks into carbon and hydrogen upon exposure to the high temperature molten bath and creates an endothermic or localized cooling effect at the bottom.

Figure 11:
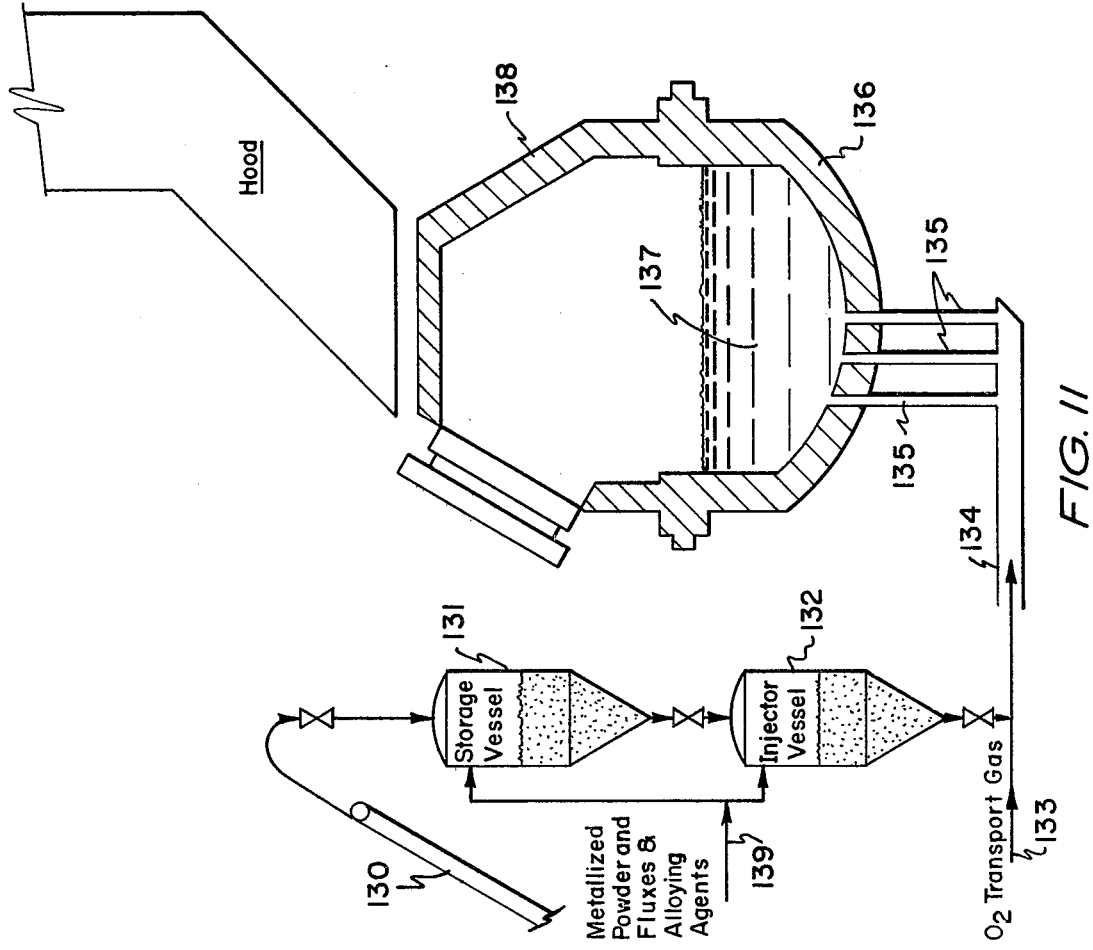

FIG. 11 shows an example of such a bottom-blown furnace 138, hereinafter referred to as furnace 138, having a melt 137 thereon. To feed furnace 138 metallized iron ore powder is preferably passed by conveyor 130 into a storage vessel 131 and thence to an injection vessel 132. Prior to that passage, the powder preferrably has appropriate amounts of alloying agents and flares, such as lime or limestone, added thereto to provide a desired melt 137 content. Further, as the process of such furnace 138 depends upon a close control of oxygen added to the melt, this arrangement preferrably utilizes oxygen ($O_2$) as a transport gas for moving the mixture of metallized powder, alloying agents and flares through a transport line 133 entering injection pipe 134 from where it is passed through tuyeres 135 and through the bottom refractory lining 136 of furnace 138 into melt 137. To closely control the oxygen input to the melt, and unlike the earlier described arrangements where the transport gas was used to pressurize the storage and injection vessels, this arrangement preferrably employs an inert gas that will not effect the melt, such as argon, that enters at 139 to pressurize the vessels 131 and 132.

Hereinabove have been shown a number of examples of post-treatment handling, preparation, and utilization of metallized iron ore powder in various steelmaking operations. It should be obvious the present disclosure is a simplification of fairly complex apparatus and procedure and so should be taken as teaching the concepts of the invention; which concepts, methods, and the apparatus shown should be understood to not be limited to the present disclosure, but should be taken to include modifications, changes, or additions thereto that would be obvious to one skilled in the art from the teachings hereof.

Wet Product Post-Treatment and Usage

Fluidized bed reactor systems that produce hot metallized iron ore powders are remarkably good "steady state machines" that provide excellent reliabilities and on-line product availabilities, provided, external factors and associated facilities do not require deviation from established operating conditions. This particularly applies to the continuous discharge of hot product, with the facilities that are most prone to operating problems being those ancilliaries that operate at high temperatures such as hot briquetting. Therefore, a conventional close-coupled hot briquetting operation with recycle facilities for unbriquetted powder, as previously discussed, is intolerable in maintaining acceptable operation. Moreover, even a "once-through" briquetting facility as illustrated in FIG. 3 of the present invention, or even relatively low temperature post-treatment facilities as illustrated in FIG. 2 of the present invention present possibilities for operating problems and downtime. Therefore, the apparatus and method of the present invention should also be taken to include novel features for handling, storage, transport, and usage of metallized iron ores based upon post-treatment with water. To fully appreciate the novel features, prior technical discussion is presented as follows.

Effects of Water on Metallized Iron Ores

As commonly known water will oxidize or rust metallic iron according to the principle reactions

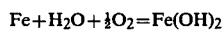

$Fe + H_2O + \frac{1}{2}O_2 = Fe(OH)_2$

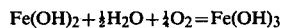

$Fe(OH)_2 + \frac{1}{2}H_2O + \frac{1}{4}O_2 = Fe(OH)_3$

Related reactions also generate gaseous hydrogen. As has been determined by the present inventor, oxygen, as shown in these reactions, plays the major role in the rates of reaction. Starting with air-saturated fresh water the rate of oxidation of iron therefore progressively decreases as dissolved oxygen is consumed, and the rate also decreases as an iron oxide or rust film forms over iron surface and acts as a barrier to further oxygen diffusion. When all dissolved oxygen is consumed, the rate of oxidation is practically negligible. The effect of water temperature is also significant in that the rates of oxidation approximately doubles for each 55° F. (30° C.) rise, but such rates markedly fall above 175° F. (80° C.) because the decrease in oxygen solubility at higher temperatures overshadows the accelerating effect of higher water temperature. Experimental data obtained by the present inventor on the effects of water in reoxidizing metallized iron ore was obtained with weighed quantities immersed in water, and involved measuring the volumes of generated hydrogen gas at definite time intervals. Using this data, a caculation was made of the reoxidiation rate from the volume of gas evolved, which results were checked by conventional laboratory analytical methods. One experiment involved starting with air saturated water that contained initially about 10 mililiters of dissolved oxygen per liter of water. Immersing the powder therein produced a reoxidation thereof indicated by gas evolution, and demonstrated that the dissolved oxygen was consumed in generally less than 24 hours, whereupon gas evolution decreased markedly. The resulting calculated loss in metallization after the 24 hours was approximately 0.006 percent and this low value was undetectable by conventional analytical methods. After dissolved oxygen was consumed, the rate of gas evolution thereafter remainedj essentially constant at the equivalent of about 8 mililiters per kilogram of metallized powder per day. This corresponded to a metallization loss of only 0.006 percent per day, or about 0.16 percent per month, and about two percent per year. Such monthly and yearly losses were confirmed by laboratory analysis.

The present inventor then investigated the use of water quenching of both high and low temperature metallized iron ores and total immersion as practical means for product post-treatment followed by handling, storage, and transport, and use. It was determined therefrom that, during long-term total immersion, although the covering liquid surface was exposed to air, providing an appreciable partial pressure differential driving force between atmospheric oxygen and oxygen dissolved in water, the rate of solution of fresh oxygen from air was essentially negligible into unaerated and unagitated ponds or lagoons. This fact, together with the relatively small liquid surface areas and volumes in relation to large tonnages of stored or impounded metallized iron ore rendered the effect of reoxidation essentially negligible as had also been determined in the laboratory. Additionally, the differences between metallized iron ores stored by total water immersion as compared to storage in open stockpiles was striking. For total immersion essentially negligible reoxidation occurred over periods of several months as described, regardless of whether the physical form of the metallized iron ore was as powder or as agglomerates. However, for limited amounts of water such as rainfall on an initially dry stockpile of metallized briquiettes or pellets, the results were disastrous; namely, rapid reoxidation and hydrogen evolution and eventually stockpile burning if the critical stockpile height was exceeded. Wet metallized iron ore in powder form acted completely differently in stockpile. When reclaimed from total water immersion and placed into a wet stockpile, considerable water at first drained by gravity but the interior remained thoroughly wet. When this wet stockpile remained unattended for long periods, reoxidation was practically undetectable. In fact, slightly less reoxidation occurred than the slight reoxidation that took place when the same material was totally immersed in water. The reason for this phenomenon is that atmospheric oxygen could not diffuse into the interior and replenish oxygen that was initially dissolved in the interior water. Thus, storage capabilities of wet metallized powder were determined by the present inventor to be essentially as favorable as the heretofore discussed storage of metallized iron ore as a dry powder.

The foregoing described experimental evidence provides the basis for new and novel apparatus and methods for accomplishing several practical objectives. The first objective is to provide completely reliable alternative for removing and post-treating hot metallized iron ore product emerging from direct reduction plants by water quenching. The second objective of a complete product immersion in water is to provide an alternative long-term storage method in which neligible reoxidation occurs. The third objective of such procedures is to provide for storage procedures applicable to the products of all direct reduction processes regardless of the physical form being as powder or as agglomerates. The fourth objective is to provide for metallized ores in powder form, for alternative transport procedures, namely by hydraulic pipelines. A final objective being for metallized iron ores that may have been lost to tailing ponds, even for years, to provide for recovery thereof, as by magnetic separators, to reclaim such for use in iron and steelmaking furnaces, often without further processing to increase their metallizations. Additionally, wet handling and wet transport of such wet product is feasible in open rail cars, ocean-going vessels, barges, and the like. Moreover, when product is transported in a wet condition, natural ventilation is generally adequate to remove any trace of the slight amount of hydrogen gas that might be generated. This is in sharp contrast to the large quantities of hydrogen generated from wet agglomerates that afford no resistance to air diffusion into bulk storage piles. However, although severe hydrogen evolution and the heating up of stockpiles is very much a major problem with metallized agglomerates, because of the extreme difficulty of maintaining these in a "bone dry" condition, co-mingling of wet or dry metallized powder, as discussed earlier herein, with wet or dry metallized agglomerates provides assurance that neither hazards of appreciable hydrogen evolution nor spontaneous ignition and burning will occur in stockpile and during transport. Such co-mingling fills the void volumes and destroys the permeability for air to diffuse. Such co-mingling also provides economic advantages in that this procedure results in a greater density, and mass per unit volume, that is usually in the order of one-third. Therefore, the various transport means will accommodate considerable more co-mingled material.

To conclude this technical discussion that is considered by the present inventor as necessary to appreciate all aspects of the forthcoming descriptions of product wet handling apparatus and methods, it is important to appreciate two additional technical points. First, the present inventor has determined that after metallized iron ores in any physical form are post-treated by water immersion, all metallic iron surfaces uniformly acquire an iron oxide film. After drying, this film remains on the material and is even more stable in storage in the dry condition. In effect, passivation occurs to an extent at least equal to metallized iron ore treated solely with inert gas, as was discussed earlier herein. Secondly, wet metallized iron ore must, of course, be dried prior to final usage in iron and steelmaking furnaces and operations. In this regard such drying procedures also contain novel subject matter.

Figure 12:
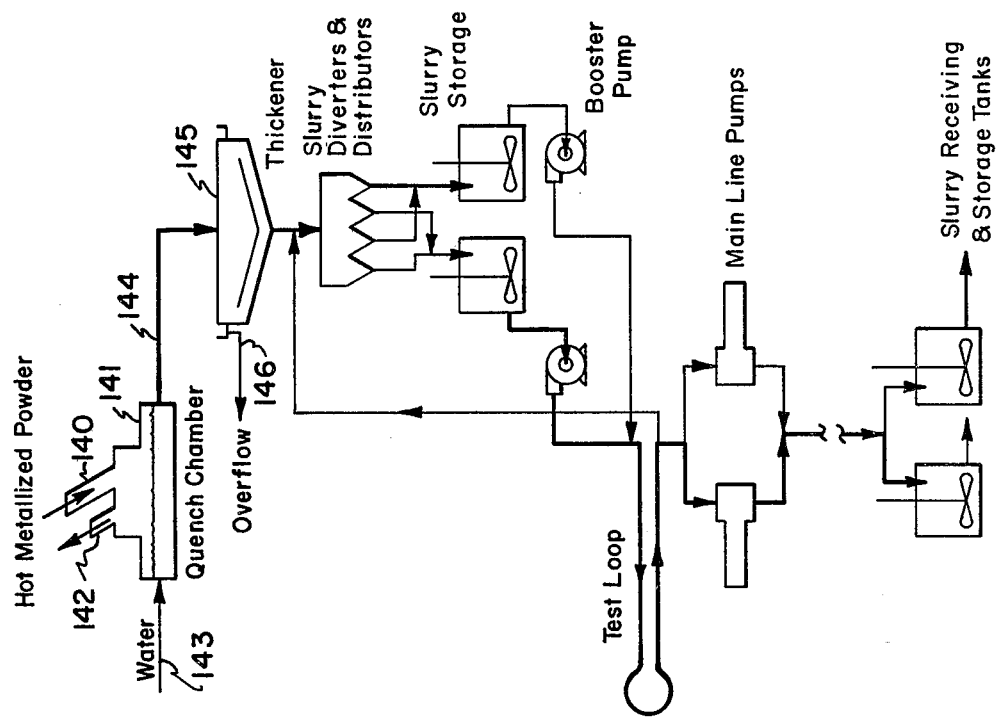

FIG. 12 illustrates apparatus and a method for its use whereby the indicated facilities provide direct water quenching of hot metallized iron ore powder along with optional associated downstream handling facilities. However, such a quenching facility above may be employed for any physical form of metallized iron ore, regardless of whether or not they enter at high or low temperatures. In FIG. 12 hot powder 140 enters quench chamber 141 through which water 143 flows at velocities sufficient to convey the quenched material through pipe or channel 144 and into thickener 145. A vent 142 is provided to remove any steam produced during the quenching operation. Excess water 146 overflows from thickener 145 and metallized powder is withdrawn as a slurry and enters facilities as are conventionally required for preparation and short or long distance hydraulic conveying. Because such facilities as shown in FIG. 12 are conventional and optional, their detailed descriptions are unnecssary. However, such facilities are included in FIG. 12 to demonstrate the ability of transporting metallized powders by hydraulic pipelines with no deleterious effects, such transport has not heretofore been recognized as possible nor practical by those skilled in the art.

Proceeding now to FIG. 13, the slurry consisting of metallized iron ore and water is received into agitated storage tanks 150, and from thence it passes via pipeline 151 to a storage lagoon or to a pad 152 at which place excess water drains by gravity with such water 153a preferrably being returned to slurry receiving-storage tanks 150. Alternatively, said slurry from tanks 150 passes via pipeline 155 to disc filters 153, or other suitable equipment, for more rapid, if desired, de-watering of the metallized powder. After which de-watering, the slurry moves therefrom to open wet storage 154. Wet metallized powder is preferrably withdrawn from wet storage 154 or from storage pad 152 by conventional apparatus and proceeds by suitable conventional handling and transport arrangements to a dryer facility.

The heretofore described product handling shown in FIG. 2 should be taken as being sufficient for final de-watering before use in iron and steelmaking furnaces and operations.

The ability to hydraulically handle and convey metallized iron ore powders without reoxidation provides a basis for the upgrading of metallized powders that might be produced from low grade iron ores. As is presently practiced by all direct reduction processes and facilities, the iron ore feed materials are now totally confined to high grade ores or concentrates. The reasons are first and to a minor degree that low grade ores such as taconites and the like contain substantial quantities of gangue constituents as mainly silica ($SiO_2$) and alumina ($Al_2O_3$). These constituents, in direct reduction facilities, result in penalties as to energy required per unit quantity of metallic iron produced. The second and major reason for excluding the use of these ores is that major penalties and large capital expenditures would be incurred in iron and steelmaking operations to flux the gangue constituents thereof and handle the resulting large slag volumes. Thus, low grade ores are presently being utilized only by prior processing involving costly magnetic roasting, if such ores are not magnetic in their natural state, magnetic separation, and often using flotation cells to obtain final high grade concentrates. Such concentrates are then balled in pelletizing discs or drums with binder agents and the resulting "green" pellets are fired at high temperatures to produce strong oxide pellets suitable for direct reduction facilities designed for agglomerates. Agglomerates are not suitable for use in direct reduction facilities employing fluidized beds, and, moreover, concentrates are also unsuitable by virtue of being too fine in size for fluidized bed processing. New technology for eliminating the costly prior processing as now described for low grade ores, and to make these ores suitable for processing in fluidized bed reactor systems would be significant advances in the art.

FIG. 14 shows apparatus and a method for accomplishing the objectives discussed, enabling a utilization of low grade ores in direct reduction processing without employing prior purification procedures. Shown therein, low grade fine size ore 160 that preferrably has been metallized in fluidized bed reactors, enters quench chamber 161 from which steam is vented at 162, and water 163 flows therethrough. The water flow conveys the cooled metallized powder 160 through line 164 and into thickener 165. Water overflow 166 occurs from thickener 165 and a slurry of metallized powder passes for primary grinding, such as in a wet ball mill 168. The resulting material enters magnetic separators 170 from whence gangue constituents or tailings 179 pass to disposal. The remaining material passes through line 171 to surge 172 from whence slurry pump 173 conveys it to hydrocyclone 174. Cyclone underflow 175 passes the material into a secondary ball mill 176 for re-grinding. Cyclone overflow through line 178 passes the material to hydro-separators 180, where additional tailings 181 are removed and discarded. The remaining material passes through additional magnetic separators 183 for final upgrading, with tailing 185 therefrom going to disposal. Final upgraded concentrate 185 is then moved, as shown, to thickener 186 and thence, via line 187, to storage lagoons or pads for drainage, or via line 188 to filters and to filter cake storage 190. From storage the upgraded metallized powder is handled, stored, transported, and used in iron and steelmaking as heretofore described. Metallized agglomerates made from low grade ores may similarly be handled in facilities shown in FIG. 14.

The process of the present invention, it should be understood, is not dependent upon the particular conditions of metallized ore input shown and described herein, which figures have been included for demonstration only, said information representing only a model with approximate relationships between the components providing for a more complete illustration and understanding of the apparatus and method of the present invention. The present invention, it should be understood, should not be taken as being dependent upon the figures shown or on any particular operating variables. From the present disclosure many variations and alternative operations should be readily apparent to one skilled in the art which variations and alternative operations would still fall within the scope of the present disclosure.

Although a preferred embodiment of the apparatus of the present invention and a method for its use have been herein disclosed, it should be obvious that the present disclosure is made by way of example and that variations are possible without departing from the subject matter coming within the scope of the following claims, which claims I regard as my invention.

I claim:

1. Apparatus for wet-post treating of a hot metallized iron ore product produced by direct reduction apparatus and methods to prevent re-oxidation thereof comprising, a water quench chamber;

means for moving hot metallized produce into said quench chamber;

pump means for moving a slurry of metallized product and water from said wet quench chamber; (and)

circulation means for keeping the metallized product suspended in said slurry; and storage means for receiving and storing indefinitely said slurry of metallized product under water.

2. Apparatus as recited in claim 1, further including, thickener means receiving the slurry from the water quench chamber for removing water therefrom, and passing said thickened slurry to the pump means for moving the slurry.

3. Apparatus as recited in claim 1, further including, grinder means for grinding the metallized product in the slurry to a consistant particle size; and means for separating tailings out of the slurry.

* * * * *